US012640373B2

(12) United States Patent
Ahn et al.

(10) Patent No.: US 12,640,373 B2
(45) Date of Patent: May 26, 2026

(54) NEGATIVE ELECTRODE CURRENT COLLECTOR FOR LITHIUM METAL BATTERY, MANUFACTURING METHOD THEREOF, AND LITHIUM METAL BATTERY COMPRISING THE SAME

(71) Applicants: LG ENERGY SOLUTION, LTD., Seoul (KR); POSTECH RESEARCH AND BUSINESS DEVELOPMENT FOUNDATION, Pohang-si (KR)

(72) Inventors: Kyoung Ho Ahn, Daejeon (KR); Byoung Woo Kang, Pohang-si (KR); Solji Park, Daejeon (KR); Chul Haeng Lee, Daejeon (KR); Wontae Lee, Pohang-si (KR); Yongho Shin, Pohang-si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 648 days.

(21) Appl. No.: 18/011,806

(22) PCT Filed: Dec. 2, 2021

(86) PCT No.: PCT/KR2021/018152
§ 371 (c)(1),
(2) Date: Dec. 20, 2022

(87) PCT Pub. No.: WO2022/119359
PCT Pub. Date: Jun. 9, 2022

(65) Prior Publication Data
US 2023/0253565 A1 Aug. 10, 2023

(30) Foreign Application Priority Data
Dec. 4, 2020 (KR) ........................ 10-2020-0168163
Dec. 1, 2021 (KR) ........................ 10-2021-0170445

(51) Int. Cl.
H01M 4/62 (2006.01)
H01M 4/02 (2006.01)
(Continued)

(52) U.S. Cl.
CPC ......... H01M 4/628 (2013.01); H01M 4/0404 (2013.01); H01M 4/134 (2013.01);
(Continued)

(58) Field of Classification Search
CPC ........... H01M 10/052; H01M 10/0525; H01M 4/134; H01M 4/64–84; H01M 4/628; H01M 4/0404; H01M 4/661
See application file for complete search history.

(56) References Cited

U.S. PATENT DOCUMENTS

2014/0287327 A1 9/2014 Lee et al.
2016/0099463 A1 4/2016 Lee et al.
(Continued)

FOREIGN PATENT DOCUMENTS

CN 110431693 A 11/2019
EP 3002807 B1 5/2018
(Continued)

*Primary Examiner* — Allison Bourke
*Assistant Examiner* — Travis L. Martin
(74) *Attorney, Agent, or Firm* — Bryan Cave Leighton Paisner LLP

(57) ABSTRACT

A negative electrode current collector for a lithium metal battery. The negative electrode current collector includes a metal current collector substrate and a coating layer. The coating layer is formed on at least one surface of the metal current collector substrate. The coating layer includes a ferroelectric material, a metallic material capable of alloying with lithium, a conductive material, and a binder.

12 Claims, 12 Drawing Sheets

(51) Int. Cl.

| | | |
|---|---|---|
| *H01M 4/04* | (2006.01) |
| *H01M 4/134* | (2010.01) |
| *H01M 4/66* | (2006.01) |
| *H01M 4/70* | (2006.01) |
| *H01M 10/052* | (2010.01) |

(52) U.S. Cl.
CPC ............. *H01M 4/661* (2013.01); *H01M 4/70* (2013.01); *H01M 10/052* (2013.01); *H01M 2004/027* (2013.01)

(56) References Cited

U.S. PATENT DOCUMENTS

| | | | |
|---|---|---|---|
| 2017/0117535 A1* | 4/2017 | Yoon ................... | H01M 4/1391 |
| 2018/0277848 A1 | 9/2018 | Matsumura et al. | |
| 2019/0131617 A1 | 5/2019 | Ahn et al. | |
| 2020/0028153 A1 | 1/2020 | Han et al. | |
| 2020/0259163 A1 | 8/2020 | Yu | |
| 2020/0274142 A1 | 8/2020 | Youn et al. | |
| 2021/0098791 A1 | 4/2021 | Yoon et al. | |
| 2021/0119203 A1* | 4/2021 | Kim ....................... | H01M 4/366 |
| 2021/0143481 A1* | 5/2021 | Park ......................... | C09D 5/24 |
| 2022/0181637 A1* | 6/2022 | Jang ........................ | H01M 4/62 |

FOREIGN PATENT DOCUMENTS

| | | |
|---|---|---|
| JP | H06-231749 A | 8/1994 |
| JP | H11-273683 A | 10/1999 |
| JP | 2015-512129 A | 4/2015 |
| JP | 2016-076487 A | 5/2016 |
| JP | 2018-170128 A | 11/2018 |
| JP | 2020-064824 A | 4/2020 |
| KR | 10-2005-0087245 A | 8/2005 |
| KR | 10-2013-0101459 A | 9/2013 |
| KR | 10-2018-0063065 A | 6/2018 |
| KR | 10-2018-0077083 A | 7/2018 |
| KR | 10-2019-0042471 A | 4/2019 |
| KR | 10-2020-0004755 A | 1/2020 |
| KR | 10-2020-0018259 A | 2/2020 |
| KR | 10-2020-0018902 A | 2/2020 |
| WO | 2017/056488 A1 | 4/2017 |

* cited by examiner

【FIG. 1】
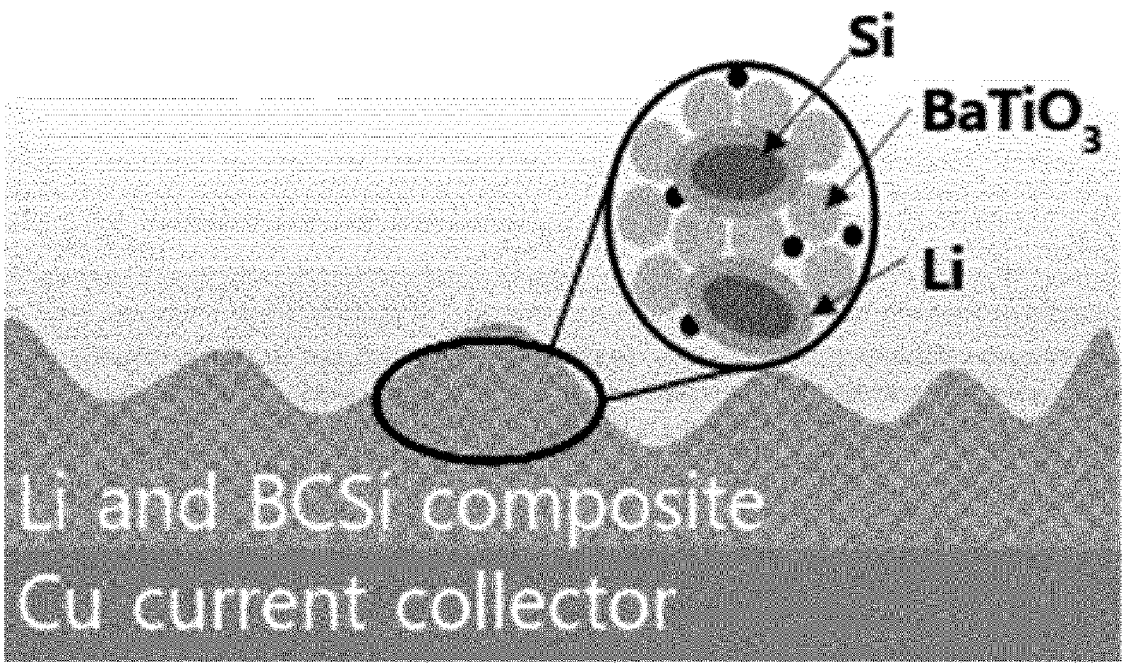

【FIG. 2】
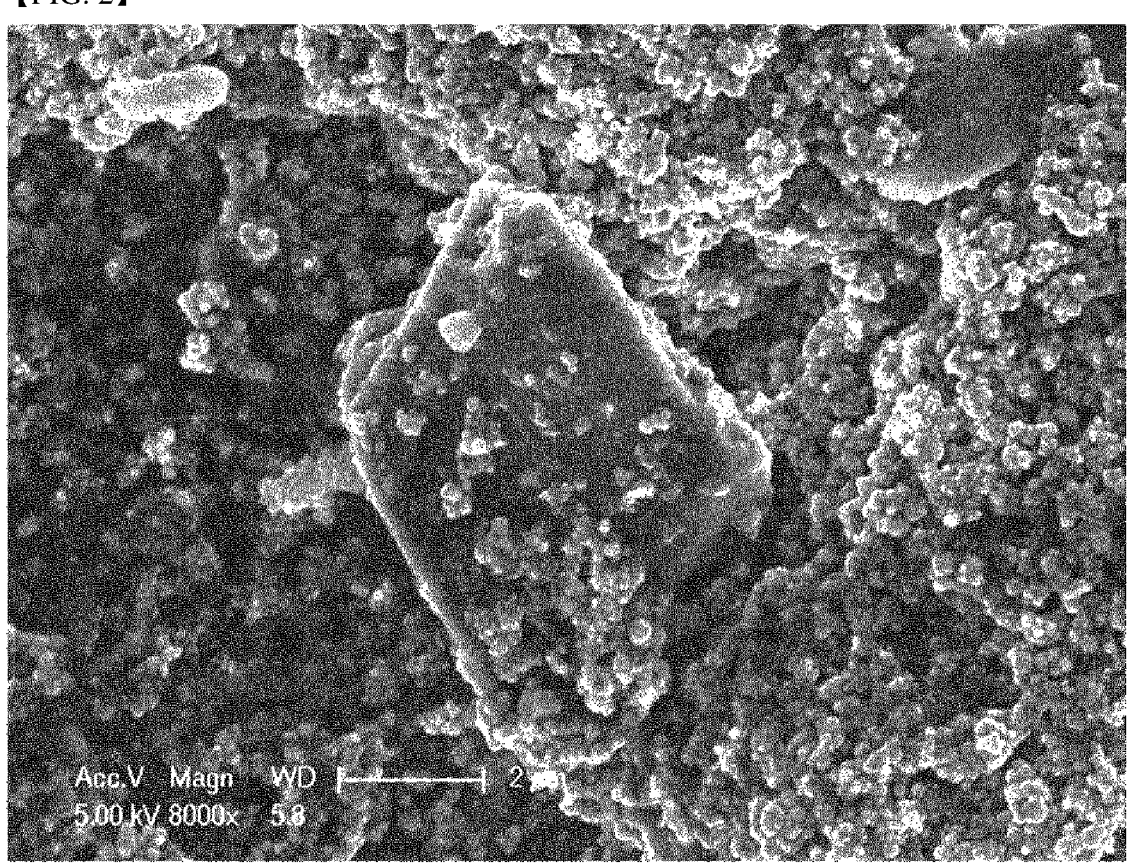

[FIG. 3]
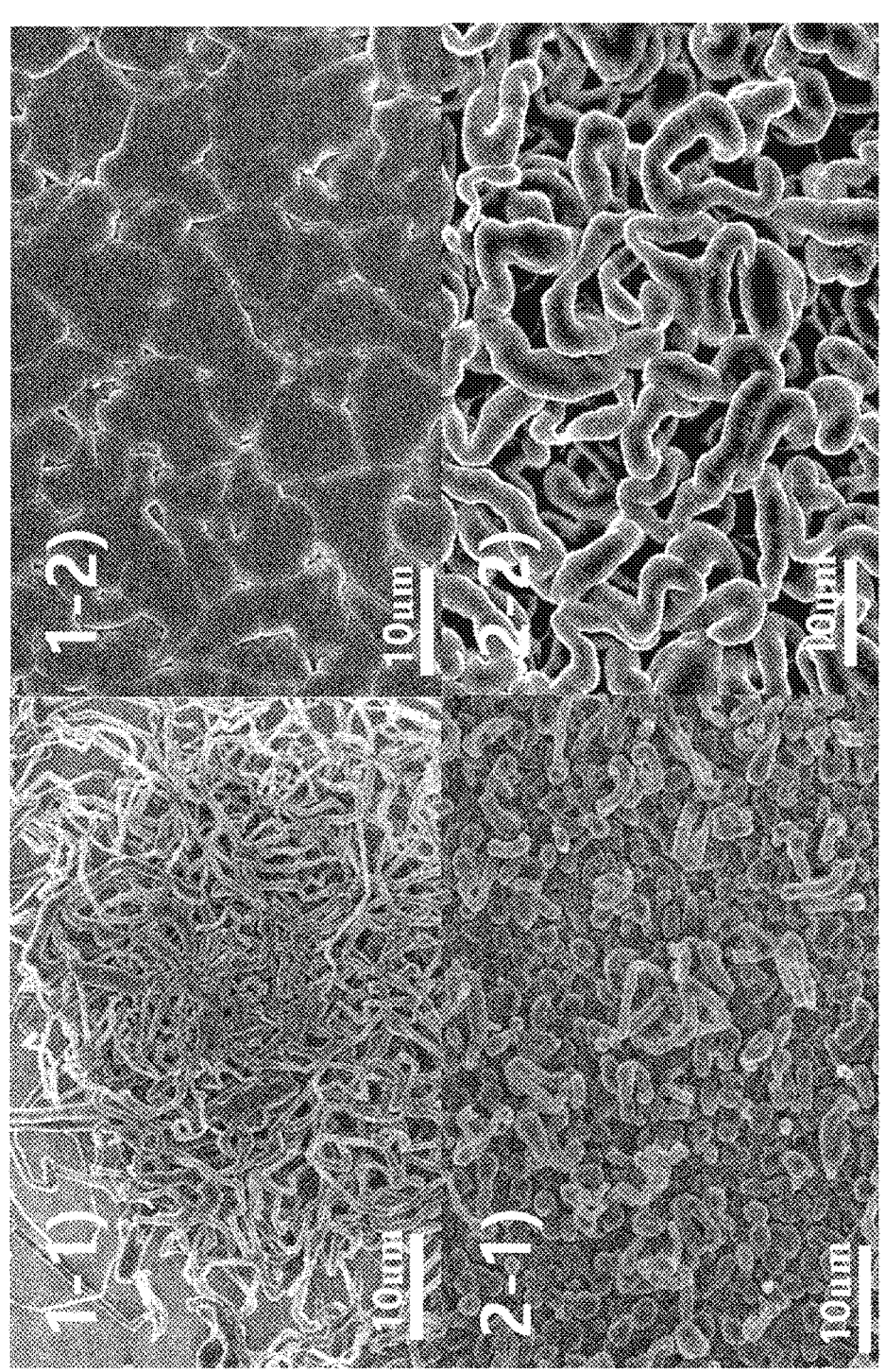

[FIG. 4]
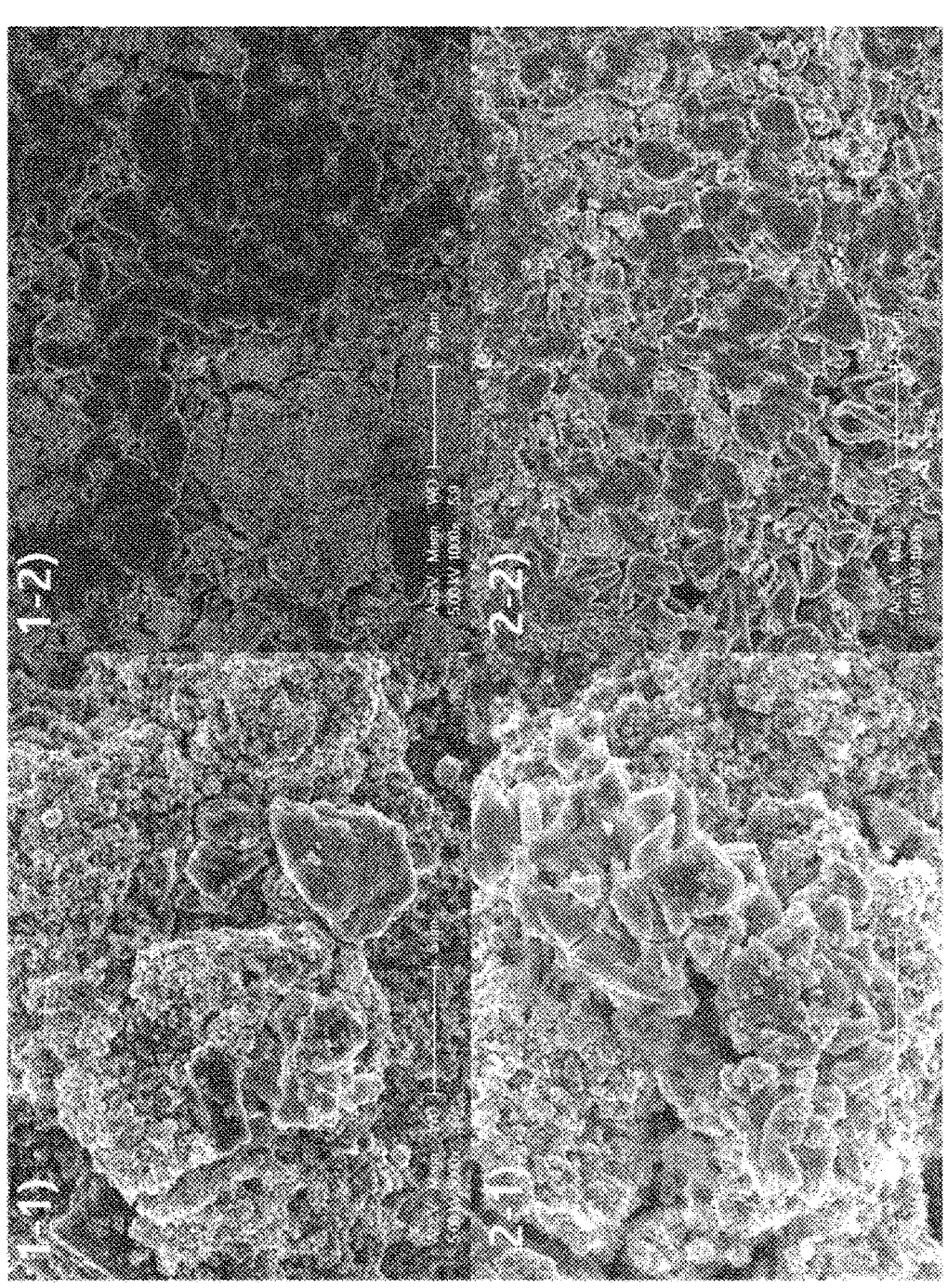

【FIG. 5】
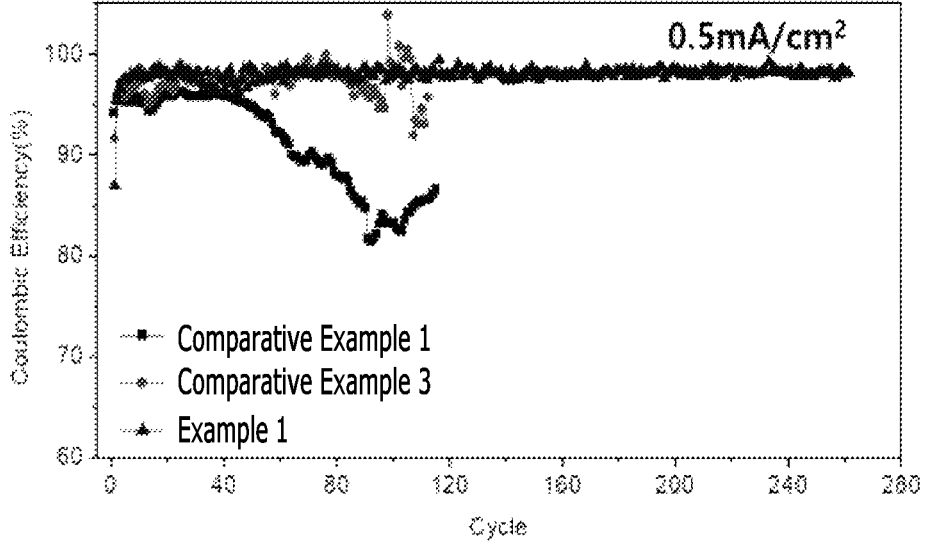

[FIG. 6]
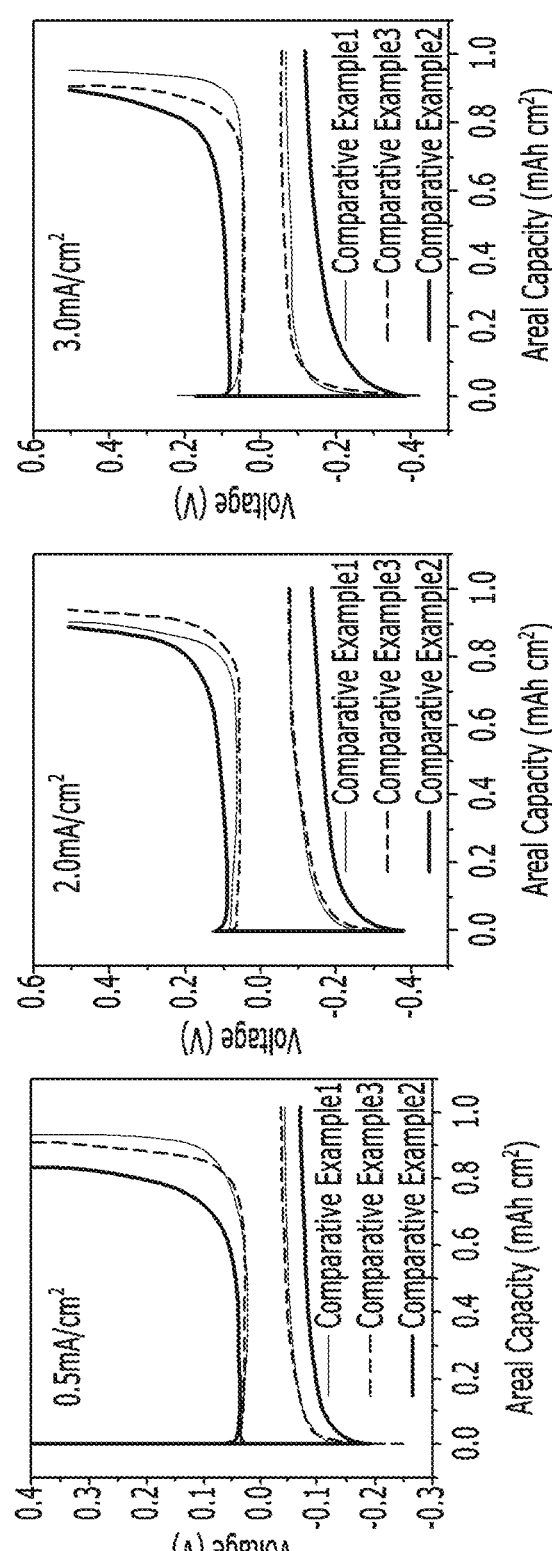

【FIG. 7】
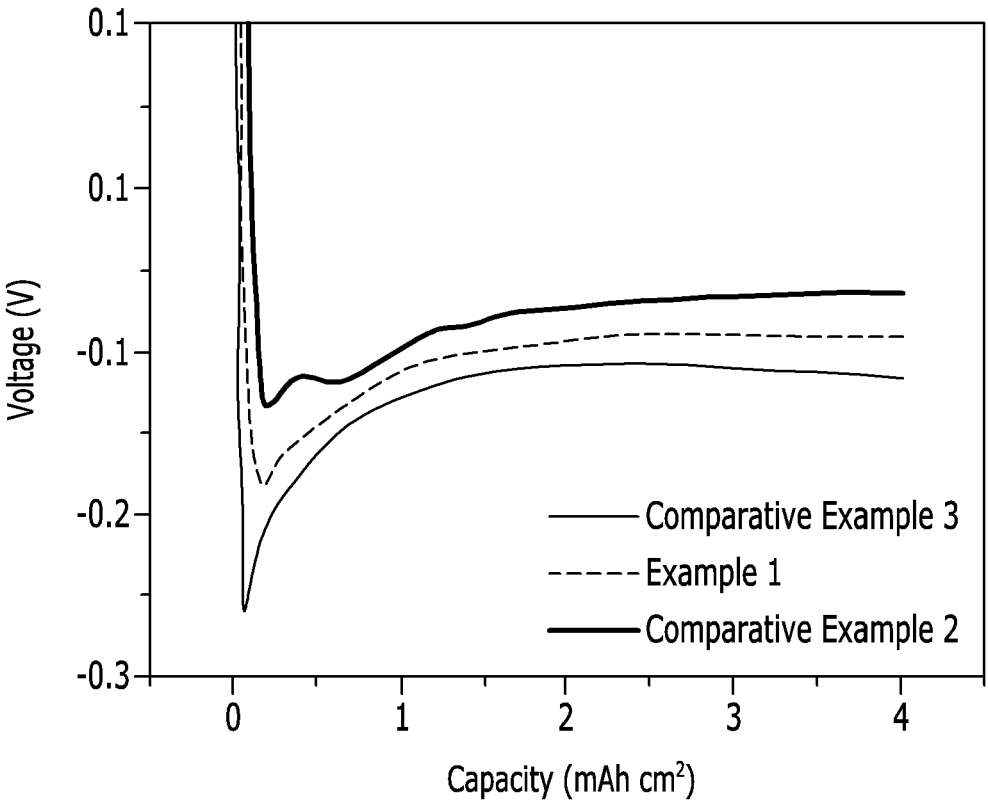

【FIG. 8】
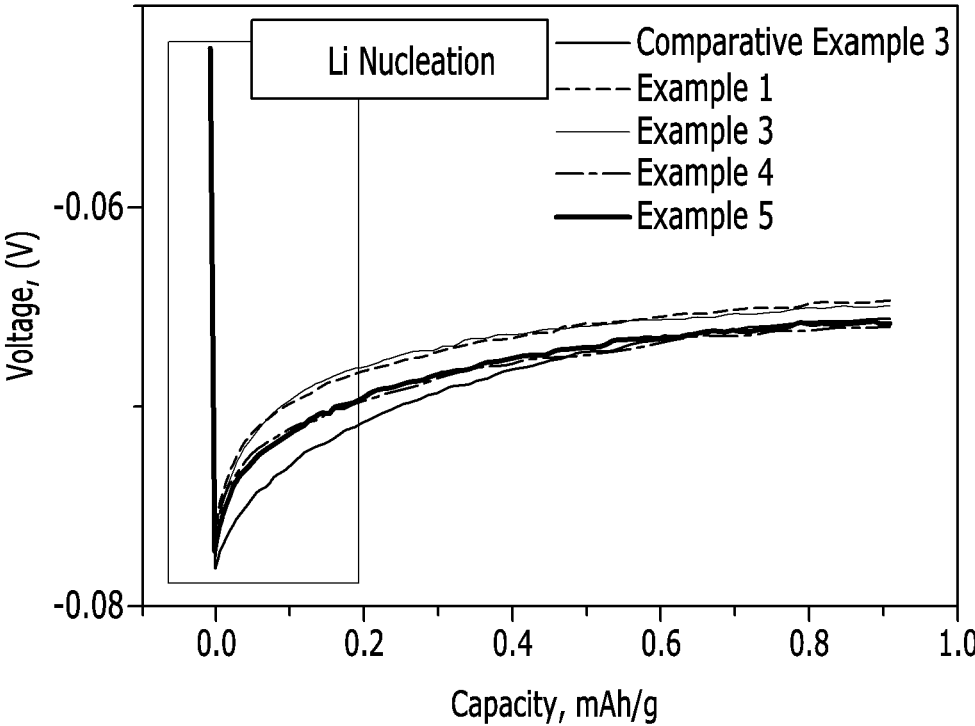

[FIG. 9]
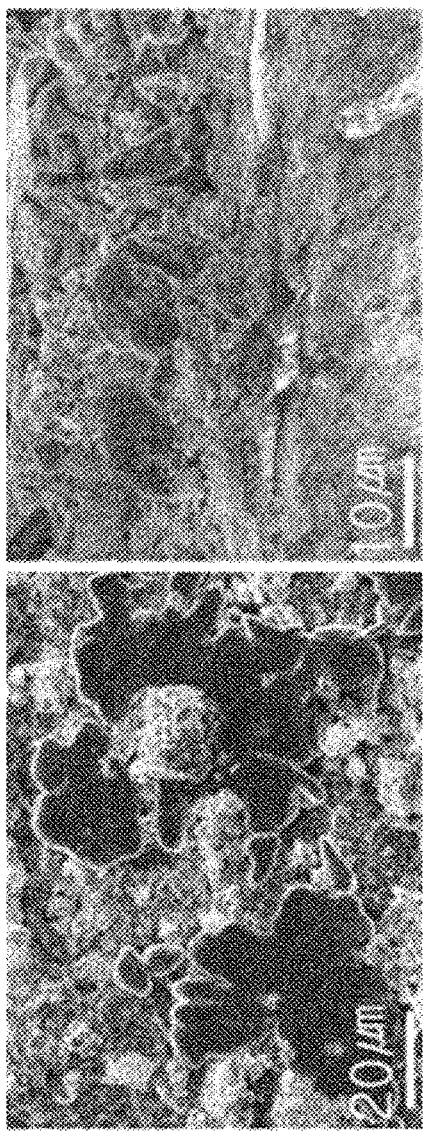

[FIG. 10]
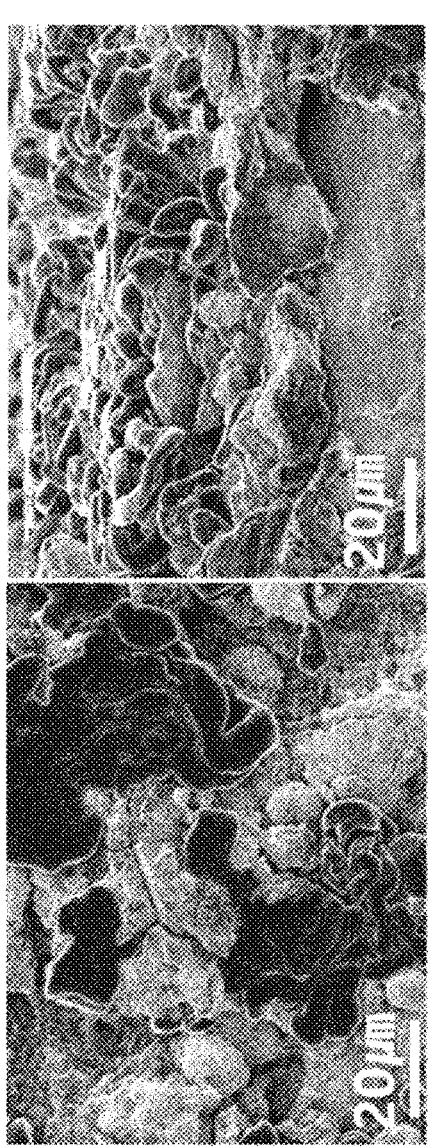

[FIG. 11]
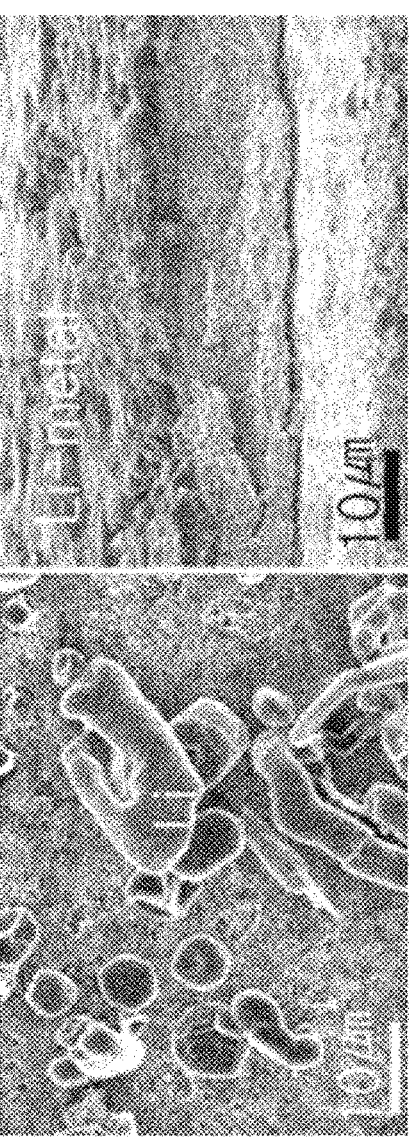

[FIG. 12]
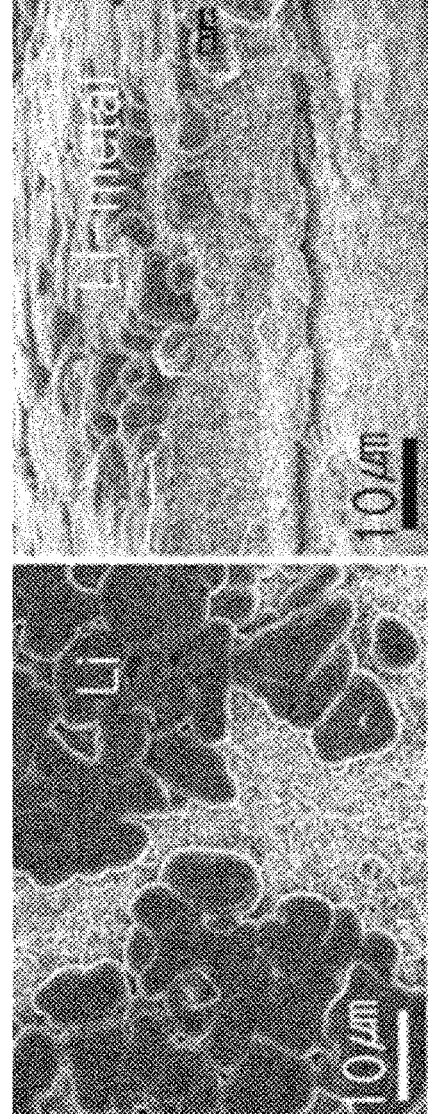

NEGATIVE ELECTRODE CURRENT COLLECTOR FOR LITHIUM METAL BATTERY, MANUFACTURING METHOD THEREOF, AND LITHIUM METAL BATTERY COMPRISING THE SAME

CROSS-REFERENCE TO RELATED APPLICATION(S)

The present application is a National Phase entry pursuant to 35 U.S.C. 371 of International Application PCT/KR2021/018152 filed on Dec. 2, 2021, which claims priority from and the benefit of Korean Patent Application No. 10-2020-0168163 filed on Dec. 4, 2020 and Korean Patent Application No. 10-2021-0170445 filed on Dec. 1, 2021 in the Korean Intellectual Property Office, the disclosures of which are incorporated herein by reference in their entirety.

TECHNICAL FIELD

The present disclosure relates to a negative electrode current collector for a lithium metal battery, a manufacturing method thereof and a lithium metal battery comprising the same.

BACKGROUND ART

Graphite has been used as all negative electrodes for lithium secondary batteries which are currently available from the market, but along with the rise of the development of high-performance secondary batteries with high capacity density and output, there are increasing attempts to use lithium metal as a negative electrode.

Firstly, graphite has a small theoretical capacity of 372 mAh/g and a low lithium ion conductivity of $10^{-12} \sim 10^{-14}$ $cm^2 \cdot s^{-1}$ when fully charged with Li, and thereby realizes a low capacity of less than 30% relative to the theoretical capacity at a 2C rate. Graphite is not excellent in its intrinsic electrochemical properties for using graphite as a negative electrode in high-performance secondary batteries that require capacity per volume and high output, and thus is unsuitable for use as a next-generation battery negative electrode material.

Secondly, in the case of graphite, the types of electrolytes that can be used stably are limited. Graphite, which is an interlayer material, forms an interlayer compound with lithium ions as well as anions and solvent molecules. Typically, when using propylene carbonate (PC) liquid electrolyte, the co-intercalation phenomenon in which lithium ions and solvent molecules enter the inside of graphite at the same time induces the peeling of the graphene layer forming graphite, and the capacity reduction resulting therefrom is gradually accelerated, which causes a problem in long-term use.

On the other hand, unlike graphite, lithium metal is free from the above problems. Lithium metal has a theoretical capacity (3862 mAh/g) 10 times or more higher than that of graphite, and a lithium metal deposition/desorption efficiency of 90% or more even under a current density condition of 2.0 $mA/cm^2$ or more, and therefore, can be used as a negative electrode of a high-performance secondary battery.

However, lithium metal has a porous structure, short circuit, and lithium fine powder called dead Li due to the growth of lithium metal dendrites appearing on the metal surface during repeated charge and discharge processes, which causes problems in safety and long-term lifespan characteristics. The formation of lithium metal dendrites is typically described by a sand time model, and the rapid decrease in the lithium ion concentration present on the surface of the lithium metal and the charge imbalance of cations and anions resulting therefrom trigger the growth of lithium metal dendrite. These problems can be alleviated through a ceramic layer or graphene coating on the lithium metal surface, but it is limited to methods that physically press the growth of lithium metal dendrites. In order to effectively suppress lithium metal dendrites, it is necessary to analyze from the nucleation stage to the growth stage of lithium metal dendrites, and there is a need to develop a negative electrode current collector capable of adjusting this.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

It is an object of the present disclosure to provide a negative electrode current collector for a lithium metal battery that suppresses dendrite formation and exhibits uniform Li growth behavior and improved electrochemical performance by adjusting the lithium ion concentration and nucleation seed site around the negative electrode current collector, and a manufacturing method thereof.

It is another object of the present disclosure to provide a lithium metal battery including the same.

According to one embodiment of the present disclosure, there is provided a negative electrode current collector for a lithium metal battery, comprising: a metal current collector substrate, and a coating layer formed on at least one surface of the metal current collector substrate and containing a ferroelectric material, a metallic material capable of alloying with lithium, a conductive material, and a binder.

Here, the metal current collector substrate may be one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy, and specifically, it may be a metal including copper.

In one embodiment, the coating layer may contain 70 to 89 parts by weight of a ferroelectric, 3 to 10 parts by weight of a metallic material alloying with lithium, 3 to 10 parts by weight of a conductive material, and 5 to 20 parts by weight of a binder, based on 100 parts by weight of the coating layer.

In one embodiment, the ferroelectric material may be at least one selected from the group consisting of organic ferroelectric materials containing $BaTiO_3$, $KNbO_3$, $NaTiO_3$, $KTaO_3$, $Pb(Zr, Ti)O_3$, $SrBiTa_2O_9$, $BiTiOi_2$, $LiTaO_3$, $LiNbO_3$, $WO_3$, $KH_2PO_4$ or $NaKC_4H_4O_6 \cdot 4H_2O$ together with a polymer.

In one embodiment, the metallic material capable of alloying with lithium may be at least one selected from the group consisting of Si, Ge, Sn, Pb, Bi, Sb, As, P, Au, Ag, Zn, Al, and their oxides, and specifically, it may be at least one selected from the group consisting of Si, Ge, and their oxides.

In this case, the metallic material capable of alloying with lithium may have a particle size (D50) of 10 nm to 10 μm.

The binder may be a polyacrylic acid (PAA) aqueous binder.

In one embodiment, the coating layer may be formed in a thickness of 1 to 10 μm.

According to another embodiment of the present disclosure, there is provided a method of manufacturing the negative electrode current collector, the method comprising the step of:

(a) mixing a powdered ferroelectric material, a metallic material capable of alloying with lithium, and a conductive material to prepare a mixture;

(b) mixing an aqueous binder with the mixture to prepare a coating layer slurry;

(c) applying the coating layer slurry to the metal current collector substrate; and (d) primarily drying a metal current collector substrate to which the coating layer slurry is applied in an air atmosphere, and secondarily drying the same in a vacuum atmosphere.

In one embodiment, the ferroelectric material may be at least one selected from the group consisting of organic ferroelectric materials containing $BaTiO_3$, $KNbO_3$, $NaTiO_3$, $KTaO_3$, $Pb(Zr, Ti)O_3$, $SrBiTa_2O_9$, $BiTiOi_2$, $LiTaO_3$, $LiNbO_3$, $WO_3$, $KH_2PO_4$ or $NaKC_4H_4O_6 \cdot 4H_2O$ together with a polymer.

In one embodiment, the metallic material capable of alloying with lithium may be at least one selected from the group consisting of Si, Ge, Sn, Pb, Bi, Sb, As, P, Au, Ag, Zn, Al, and their oxides.

The aqueous binder may be a polyacrylic acid (PAA) binder.

According to yet another embodiment of the present disclosure, there is provided a lithium metal battery comprising: an electrode assembly including a negative electrode in which Li metal is deposited on the negative electrode current collector described above, a positive electrode, and a separator interposed between the negative electrode and the positive electrode, and a lithium non-aqueous electrolyte.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

FIG. 1 is a simplified diagram in which Li is deposited on a negative electrode current collector according to an embodiment of the present disclosure;

FIG. 2 is a SEM photograph of the upper surface of the coated negative electrode current collector according to Example 1;

FIG. 3 shows shapes in which Li is deposited on the negative electrode current collector according to Comparative Example 3;

1-1 of FIG. 3 is an image taken by SEM after performing Li deposition at a current density of 0.5 mA/cm² for 1 hour;

4

1-2 of FIG. 3 is an image taken by SEM after performing Li deposition at a current density of 0.5 mA/cm² for 8 hours;

2-1 of FIG. 3 is an image taken by SEM after performing Li deposition at a current density of 4.0 mA/cm² for 7 minutes and 30 seconds;

2-2 of FIG. 3 is an image taken by SEM after performing Li deposition at a current density of 4.0 mA/cm² for 1 hour;

FIG. 4 shows shapes in which Li is deposited on the negative electrode current collector according to Example 1;

1-1 of FIG. 4 is an image taken by SEM after performing Li deposition at a current density of 0.5 mA/cm² for 1 hour;

1-2 of FIG. 4 is an image taken by SEM after performing Li deposition at a current density of 0.5 mA/cm² for 8 hours;

2-1 of FIG. 4 is an image taken by SEM after performing Li deposition at a current density of 4.0 mA/cm² for 7 minutes and 30 seconds;

2-2 of FIG. 4 is an image taken by SEM after performing Li deposition at a current density of 4.0 mA/cm² for 1 hour;

FIG. 5 shows the experiment results of the Coulombic efficiency measured at a current density of 0.5 mA/cm² using the negative electrode current collectors of Example 1 and Comparative Examples 1 and 3 in accordance with Experimental Example 2;

FIG. 6 shows the voltage profile of the first Coulombic efficiency test at 0.5 mA/cm², 2.0 mA/cm² and 3.0 mA/cm² using the negative electrode current collectors of Comparative Examples 1 to 3 in accordance with Experimental Example 3;

FIG. 7 shows the voltage profile when Li deposition was performed for 1 hour at a current density of 4.0 mA/cm² using the negative electrode current collectors of Examples 1 and 2, and Comparative Example 3 in accordance with Experimental Example 4;

FIG. 8 shows the voltage profile when Li deposition was performed for 2 hours at a current density of 0.5 mA/cm² using the negative electrode current collectors of Examples 1, 3 to 5 and Comparative Example 3 in accordance with Experimental Example 4; and FIGS. 9 to 12 are upper surface and cross-sectional images taken by SEM after performing Li deposition for 2 hours at a current density of 0.5 mA/cm² using the negative electrode current collectors of Example 1 and Examples 3 to 5 in accordance with Experimental Example 4.

DETAILED DESCRIPTION

Hereinafter, preferred embodiments of the present disclosure will be described in detail with reference to the accompanying drawings.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the terms and words as terms for describing most appropriately the best method he or she knows for carrying out the disclosure. Accordingly, the embodiments described herein and the configurations shown in the drawings are only most preferable embodiments of the present disclosure and do not represent the entire spirit of the present disclosure, so it should be appreciated that there may be various equivalents and modifications that can replace the embodiments and the configurations at the time at which the present application is filed, and the scope of the present disclosure is not limited to the embodiments described below.

According to one embodiment of the present disclosure, there is provided a negative electrode current collector for a lithium metal battery, comprising: a metal current collector substrate, and a coating layer formed on at least one surface of the metal current collector substrate and containing a ferroelectric material, a metallic material capable of alloying with lithium, a conductive material, and a binder.

In this case, the metal current collector substrate may be one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy, and specifically, it may be a metal including copper.

The present inventors recognized the problems of the lithium metal battery and conducted in-depth research on a fundamental method capable of suppressing the formation of lithium dendrites, and as a result, confirmed that when the composite coating layer composed of a material capable of interacting with lithium ions so as to increase the concentration of lithium ions on the surface of the negative electrode current collector, and a material capable of acting a seed for lithium metal nuclei, is formed on the surface of the current collector, effective suppression of the formation of lithium dendrites is achieved, thereby completing the present disclosure, Specifically, the inventors confirmed that a typical material capable of interacting with lithium ions is a dielectric material having polarity, and in the case of a ferroelectric material, it has a very large polarity characteristic than a general dielectric material, and thus is excellent in interaction with ions. Further, since a metallic material capable of alloying with lithium (Li) exists as a material that can be used as a seed for the Li metal nucleus, a coating layer can be formed using the above two materials, thereby obtaining the effect of the present disclosure.

However, further, in order to form such a coating layer, a vapor deposition method such as CVD can be used, but the inventors confirmed that such a preparation method has problems that it is expensive, the formation of the coating layer is slow, and a side reaction between the two materials may occur, conducted research on the preparation method capable of solving side reactions between these two materials and high production prices, and recognized that if these points are resolved, it can be commercialized as a negative electrode current collector for a lithium metal battery.

Moreover, the inventors recognized that in addition to the formation method of the coating layer, the bonding force between the coating layer and the current collector is also important, and when the bonding force between the coating layer and the electrode is low, peeling of the coating layer occurs in the electrolyte and thus, a strong bonding force between the coating layer and the electrode must be formed, and completed the present disclosure.

Specifically, the coating layer formed on the negative electrode current collector according to the present disclosure may contain 70 to 89 parts by weight of a ferroelectric material, 3 to 10 parts by weight of a metallic material alloying with lithium, 3 to 10 parts by weight of a conductive material, and 5 to 20 parts by weight of a binder, based on 100 parts by weight of the coating layer. More specifically, the coating layer may contain 75 to 85 parts by weight of a ferroelectric material, 3 to 10 parts by weight of a metallic material alloying with lithium, 5 to 10 parts by weight of a conductive material, and 5 to 15 parts by weight of a binder, based on 100 parts by weight of the coating layer.

When the above range is satisfied, the above-mentioned bonding force, interaction with lithium ions, and actions such as lithium nucleation seeds can be effectively achieved, which is thus preferable.

In this case, the ferroelectric material may be at least one selected from the group consisting of organic ferroelectric materials containing $BaTiO_3$, $KNbO_3$, $NaTiO_3$, $KTaO_3$, $Pb(Zr, Ti)O_3$, $SrBiTa_2O_9$, $BiTiOi_2$, $LiTaO_3$, $LiNbO_3$, $WO_3$, $KH_2PO_4$ or $NaKC_4H_4O_6 \cdot 4H_2O$ together with a polymer. Specifically, it may be at least one selected from the group consisting of $BaTiO_3$, $Pb(Zr, Ti)O_3$, $SrBiTa_2O_9$, and $BiTiOi_2$, and more specifically, it may be $BaTiO_3$.

Further, the metallic material capable of alloying with lithium may be at least one selected from the group consisting of Si, Ge, Sn, Pb, Bi, Sb, As, P, Au, Ag, Zn, Al, and their oxides. Specifically, it may be at least one selected from the group consisting of Si, Ge, Sn, Ag, and their oxides, more specifically, it may be at least one selected from the group consisting of Si, Ge, and their oxides. Most specifically, it may be Si, which is most preferred for the role of seed and can be easily used.

Meanwhile, in this case, the metallic material capable of alloying with lithium may have a particle size (D50) of 10 nm to 10 μm. That is, particles of various sizes can be used, and a more preferable particle size may be selected according to the metallic material capable of alloying with lithium used. For example, in the case of Si, it may have a particle size (D50) of 0.1 to 1 μm, and in the case of Sn, it may have a particle size (D50) of 50 to 400 nm.

The particle size (D50) means a particle size (diameter) at a point of n % in the cumulative distribution of the number of particles relative to the particle size. That is, D50 is the particle size at a point of 50% in the cumulative distribution of the number of particles relative to the particle size.

The D50 can be measured by using a laser diffraction method. Specifically, the powder to be measured is dispersed in a dispersion medium, and then introduced into a commercially available laser diffraction particle size analyzer (e.g., Microtrac S3500). When the particles pass through the laser beam, the diffraction pattern difference according to the particle size is measured to calculate the particle size distribution. D50 can be measured by calculating the particle diameter corresponding a point of 50% in the cumulative distribution of the number of particles relative to the particle diameter in the analyzer.

The conductive material is not particularly limited as long as it has high conductivity without causing a chemical change in the corresponding battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives can be used.

Specific examples of commercially available conductive materials include acetylene black series products available from Chevron Chemical Company, Denka Black available from Denka Singapore Private Limited, Gulf Oil Company, Ketjen black, EC series products available from Armak Company, Vulcan XC-72 available from Cabot Company and Super P available from Timcal, and the like.

Each of the binders is a type of binder known in the art, and is not limited as long as it is a type capable of improving the adhesion of the electrode components. Examples thereof may be at least one selected from the group consisting of polyvinylidene fluoride, polyvinylidene fluoride-hexafluoropropylene, polyvinyl alcohol, starch, hydroxypropyl cellulose, regenerated cellulose, polyvinylpyrrolidone, polytetrafluoroethylene, polyethylene, polypropylene, ethylene-propylene-diene polymer (EPDM), sulfonated EPDM, fluorine rubber, polyacrylic acid (PAA) as an aqueous binder, styrene-butadiene rubber (SBR), and carboxymethylcellulose (CMC). Specifically, it may be an aqueous binder, and more specifically, may be an aqueous polyacrylic acid (PAA) binder.

Meanwhile, the coating layer may be formed to a thickness of 1 to 10 μm, specifically 2 to 5 μm.

When the thickness is too thin outside the above range, it is difficult to achieve the intended effect of the present application by that much, and when the thickness is too thick, the increase in terms of effects is decreased and the overall volume is increased, so that the energy density relative to volume and the like may be lowered, which is thus not preferable.

Meanwhile, according to another embodiment of the present disclosure, there is provided a method of manufacturing the negative electrode current collector, the method comprising the step of:

(a) mixing a powdered ferroelectric material, a metallic material capable of alloying with lithium, and a conductive material to prepare a mixture;

(b) mixing an aqueous binder with the mixture to prepare a coating layer slurry;

(c) applying the coating layer slurry to the metal current collector substrate; and (d) primarily drying a metal current collector substrate to which the coating layer slurry is applied in an air atmosphere, and secondarily drying the same in a vacuum atmosphere.

That is, according to the present disclosure, as described above, the present disclosure forms a coating layer in the form of a slurry as a very simple method, without being formed by a method such as vapor deposition.

In this case, in the step (a), the types and mixing ratios of the powdered ferroelectric material, the metallic material capable of alloying with lithium, and the conductive material may be mixed at a ratio included in the coating layer mentioned above.

Here, when the aqueous binder is further mixed in the step (b), it can be mixed in the above-mentioned ratio. Examples of the aqueous binder are also as described above.

The method of applying the coating layer slurry in step (c) is not limited, and conventional methods for forming the active material layer of a lithium secondary battery may be similarly used. For example, it may be coated by a method of casting using a doctor blade.

After that, the coating layer is formed by performing the primary and secondary drying of step (d).

The primary drying step may be a step of evaporating water by using an aqueous binder of the present disclosure, and then the secondary drying step is a step of removing solvents and impurities that may remain on the current collector substrate and the coating layer by heating to a higher temperature in a vacuum state.

Here, the primary drying may be performed, for example, by heating in the range of 60° C. to 100° C. for 3 hours to 8 hours, and the secondary drying may be performed, for example, by heating in a range of 100° C. to 150° C. for 6 hours to 24 hours.

Meanwhile, according to another embodiment of the present disclosure, there is provided a lithium metal battery comprising: an electrode assembly including a negative electrode in which Li metal is deposited on the negative electrode current collector according to claim 1, a positive electrode, and a separator interposed between the negative electrode and the positive electrode, and a lithium non-aqueous electrolyte.

When depositing Li metal using the negative electrode current collector according to the present disclosure, as shown in FIG. 1, a metallic material capable of alloying with lithium acts as a seed to cause a Si—Li alloy reaction, and then a large-sized Li granule is mainly formed together with a ferroelectric material having a large polarity characteristic centering on the Si—Li alloy.

Hereinafter, by using the negative electrode current collector for a lithium metal battery according to the present disclosure having such a configuration, the electrochemical performance intended by the present disclosure will be analyzed, and described.

Example 1

A BaTiO$_3$/Micro Si coating was formed on the surface of the copper current collector substrate.

112.5 mg of powdered BaTiO$_3$ (Samsung Electro-Mechanics), 7.5 mg of Micro Si (Sigma-Aldrich, D50: 0.1~1 μm), and 7.5 mg of super P (IMERYS) were mixed in a mortar and pestle. Next, the mixture was mixed with 1.125 g of a PAA aqueous binder (2 wt %) and stirred in a vial for 6 hours. In order to maximize the reduction of the secondary particles, the secondary particles were pulverized using a friction between a stirring bar and the surface of a vial. At this time, when it was confirmed that the viscosity of the coating slurry was thick, DI water was added by 20 μL to dilute the concentration of the coating slurry.

The organic and inorganic materials on the surface of the copper foil (Wellcos) for electrodes having a thickness of 20 μm to be coated with the coating slurry were removed with DI water and acetone.

The coating slurry was applied onto the cleaned copper foil, and then casted to a height of 12 μm using a doctor blade.

The slurry-coated electrode was dried in an air atmosphere at 80° C. for 6 hours to volatilize the solvent, which was then dried at 130° C. in a vacuum atmosphere for 12 hours to remove the remaining solvent and impurities.

Through the above process, a BaTiO$_3$/Micro Si coating layer having a thickness of 3 to 5 μm was formed on the copper electrode to produce a negative electrode current collector. FIG. 2 shows the upper surface of the formed BTO/Micro Si negative electrode current collector.

Example 2

A BaTiO$_3$/Micro Si coating was formed on the surface of the copper current collector electrode.

105 mg of powdered BaTiO$_3$ (Samsung Electro-Mechanics), 15 mg of Micro Si (Sigma-Aldrich, D50: 0.1~1 μm), and 15 mg of Super P (IMERYS) were mixed in a mortar and pestle. Next, the mixture was mixed with 0.75 g of a PAA aqueous binder (2 wt %) and then stirred in a vial for 6 hours. Except for these points, a negative electrode current collector was produced in the same manner as in Example 1.

Example 3

A $BaTiO_3$/Micro Ge coating was formed on the surface of the copper current collector electrode.

112.5 mg of powdered $BaTiO_3$ (Samsung Electro-Mechanics), 7.5 mg of Micro Ge (Sigma-Aldrich, D50: 0.1~1 μm), and 7.5 mg of Super P (IMERYS) were mixed in a mortar and pestle.

Next, the mixture was mixed with 1.125 g of a PAA aqueous binder (2 wt %) and then stirred in a vial for 6 hours. Except for these points, a negative electrode current collector was produced in the same manner as in Example 1.

Example 4

A $BaTiO_3$/Nano Sn coating was formed on the surface of the copper current collector electrode.

112.5 mg of powdered $BaTiO_3$ (Samsung Electro-Mechanics), 7.5 mg of Micro Sn (Sigma-Aldrich, D50, 50~400 nm), and 7.5 mg of Super P (IMERYS) were mixed in a mortar and pestle.

Next, the mixture was mixed with 1.125 g of a PAA aqueous binder (2 wt %) and then stirred in a vial for 6 hours. Except for these points, a negative electrode current collector was produced in the same manner as in Example 1.

Example 5

A $BaTiO_3$/Nano $SnO_2$ coating was formed on the surface of the copper current collector electrode.

112.5 mg of powdered $BaTiO_3$ (Samsung Electro-Mechanics), 7.5 mg of Nano $SnO_2$ (Sigma-Aldrich, D50: 30~200 nm), and 7.5 mg of Super P (IMERYS) were mixed in a mortar and pestle.

Next, the mixture was mixed with 1.125 g of a PAA aqueous binder (2 wt %) and then stirred in a vial for 6 hours. Except for these points, a negative electrode current collector was produced in the same manner as in Example 1.

Comparative Example 1

No coating layer treatment was performed onto the surface of the 20 μm thick electrode copper foil (Wellcos). Inorganic/organic materials were removed with Di water and acetone, and then dried at 130° C. in a vacuum atmosphere for 12 hours to form a coating layer. Except for these points, the experimental conditions were the same.

Comparative Example 2

A coating layer was formed on the surface of a 20 μm-thick copper foil (Wellcos) for electrodes using a dielectric material $Al_2O_3$.

Specifically, powdered $Al_2O_3$ (Sigma-Aldrich, D50: 0.1~1 μm) was pulverized using a planetary ball mill. In a $ZrO_2$ container, $ZrO_2$ balls with a diameter of 0.5 mm and 1.0 mm were mixed in a volume ratio of 2:1:1, and then acetone was added and the mixture was pulverized at 500 rpm for 10 hours. Then, the $ZrO_2$ balls were filtered through a sieve and heated to 120° C. in an air atmosphere using a hot plate.

120 mg of pulverized $Al_2O_3$ and 7.5 mg of Super P (IMERYS) were mixed in a mortar and pestle.

Next, the mixture was mixed with 1.5 g of a PAA aqueous binder (2 wt %) and stirred in a vial for 6 hours. In order to maximize the reduction of the secondary particles, the secondary particles were pulverized using a friction between a stirring bar and the surface of a vial. At this time, when it was confirmed that the viscosity of the coating slurry was thick, DI water was added at 20 μL to dilute the concentration of the coating slurry.

However, when the viscosity of the coating slurry was very thick, a Thinky mixer was used. The coating slurry was put in a Thinky container, and then 1 mm $ZrO_2$ balls SEA was added, and secondary particles were pulverized. Mixing was performed at 2000 RPM for 2 minutes each, and DI water was added at 20 μL to adjust the viscosity. After adjusting the viscosity, the mixture was mixed at 2000 RPM for 20 minutes.

The organic and inorganic materials on the surface of the 20 μm thick copper foil (Wellcos) for electrodes to be coated with the mixed slurry were removed with DI water and acetone.

The coating slurry was applied onto the cleaned copper foil, and then casted to a height of 12 μm using a doctor blade.

The slurry-coated electrode was dried at 80° C. in an air atmosphere for 6 hours to volatilize the solvent, which was then dried at 130° C. in a vacuum atmosphere for 12 hours to remove the remaining solvent and impurities.

Through the above process, a $Al_2O_3$ coating layer having a thickness of 3 to 5 μm was formed on the copper electrode to produce a negative electrode current collector.

Comparative Example 3

A $BaTiO_3$ coating was formed on the surface of the copper current collector substrate.

112.5 mg of powdered $BaTiO_3$ (Samsung Electro-Mechanics, 300~400 nm) and 7.5 mg of Super P (IMERYS) were mixed in a mortar and pestle.

Next, the mixture was mixed with 1.5 g of a PAA aqueous binder (2 wt %) and stirred in a vial for 6 hours. Except for these points, a negative electrode current collector was produced in the same manner as in Example 1.

Experimental Example 1

Lithium Deposition and Structural Evaluation

In order to confirm the structure of lithium deposition and vapor-deposited lithium using the negative electrode current collectors produced according to Example 1 and Comparative Example 3, an SEM picture was taken and analyzed, and the results are shown in FIGS. 3 and 4.

Li having a diameter of 10 mm was deposited on the surface of the negative electrode current collector using a negative electrode current collector having a diameter of 11 mm and Li metal having a diameter of 10 mm. This is because when the size of the negative electrode current collector is smaller than that of the lithium metal, a phenomenon in which lithium is deposited on the edge occurs, whereby the size of the negative electrode current collector is made larger than the diameter of the lithium metal used.

At this time, the reaction area was 10 mm, which is the diameter of Li, and thus the current was calculated based on 10 mm. At this time, for a current density of 0.5 mA/cm², Li deposition was performed for 1 hour and performed for 8 hours, respectively, and for a current density of 4.0 mA/cm², Li deposition was performed for 7 minutes and 30 seconds, and performed for 1 hour, respectively, and the Li deposition amount was adjusted to 0.5 mAh/cm² and 4.0 mAh/cm², so that Li was formed on the negative electrode current collector.

In this case, 1 wt % of $LiNO_3$ was added to an electrolyte in which 1M LiTFSI was dissolved in a solvent of DOL (1,3-dioxolane):DME (1,2-dimehoxyethane) in a ratio of 1:1 v/v, and used as an electrolyte.

Subsequently, in order to observe the deposition behavior of Li, the cell was disassembled, the Li-deposited sample was recovered, cleaned with a DOL (1,3-dioxolane) volatile solvent in an Ar atmosphere glove box for 1 minute, and then the solvent was volatilized. In order to minimize the reaction of the deposited lithium with external air for SEM imaging of the recovered sample, the sample was placed in a vial filled with Ar gas, and exposure to air was minimized until just before SEM imaging. Several points near the center of the deposited Li were arbitrarily selected and measured, and representative images were obtained.

FIG. 3 shows shapes in which Li is deposited on the negative electrode current collector coated with only BTO according to Comparative Example 3. Specifically, 1-1 of FIG. 3 is an image taken by SEM after performing Li deposition at a current density of 0.5 mA/cm$^2$ for 1 hour. 1-2 of FIG. 3 is an image taken by SEM after performing Li deposition at a current density of 0.5 mA/cm$^2$ for 8 hours, 2-1 of FIG. 3 is an image taken by SEM after performing Li deposition at a current density of 4.0 mA/cm$^2$ for 7 minutes and 30 seconds, and 2-2 of FIG. 3 is an image taken by SEM after performing Li deposition at a current density of 4.0 mA/cm$^2$ for 1 hour.

FIG. 4 shows shapes in which Li is deposited on the negative electrode current collector coated with BTO/Micro Si according to Example 1. Specifically, 1-1 of FIG. 4 is an image taken by SEM after performing Li deposition at a current density of 0.5 mA/cm$^2$ for 1 hour, 1-2 of FIG. 4 is an image taken by SEM after performing Li deposition at a current density of 0.5 mA/cm$^2$ for 8 hours, 2-1 of FIG. 4 is an image taken by SEM after performing Li deposition at a current density of 4.0 mA/cm$^2$ for 7 minutes and 30 seconds, and 2-2 of FIG. 4 is an image taken by SEM after performing Li deposition at a current density of 4.0 mA/cm$^2$ for 1 hour.

Referring to FIG. 3, in the case of the BTO-coated sample, Li clusters consisting of elongated Li were formed at the initial stage of deposition, and then grown and get together to finally form a dense Li structure. This was also shown similarly in Comparative Example 1 in which no coating layer was formed.

However, it was confirmed that in the case of a negative electrode current collector in which the coating layer was not formed under a current density of 4.0 mA/cm$^2$, small Li nuclei were formed densely on the entire surface of the copper electrode at the initial stage of Li deposition, and then they grew in a vertical direction to finally form a porous Li structure.

Meanwhile, referring to FIGS. 3 and 4, in the case of a negative electrode current collector in which BTO was coated under a current density of 4.0 mA/cm$^2$, small-sized elongated Li clusters were formed at the initial stage of Li deposition, and then they grew and get together to form a denser Li structure than in the case of the copper current collector electrode.

However, it can be confirmed that in the case of a negative electrode current collector in which BTO/Si was coated under a current density of 4.0 mA/cm$^2$, a Si—Li alloy reaction occurred at the initial stage of Li deposition, and then large-sized Li granules were mainly formed around the Si—Li alloy.

Experimental Example 2

Evaluation of Electrochemical Performance

The electrochemical characteristic evaluation of the lithium metal battery manufactured as in Experimental Example 1 using the negative electrode current collector produced according to Example 1 and Comparative Examples 1 and 3 was conducted using a galvanostatic method. After Li deposition at 1.0 mAh/cm$^2$, Li desorption was performed until a voltage of 0.5V was reached the same current density, and the ratio of the quantity of desorbed Li to the deposited Li (Coulombic efficiency) was analyzed. The current densities proceeded at room temperature with intensities of 0.5 mA/cm$^2$, 2.0 mA/cm$^2$, and 3.0 mA/cm$^2$.

The evaluation results of the electrochemical performance according to the cycle of the negative current collectors produced according to Example 1 and Comparative Examples 1 and 3 are shown in FIG. 5 and Table 1 below.

TABLE 1

| Category | | Coulombic efficiency after 100 cycles (%) | | |
|---|---|---|---|---|
| | | 0.5 mA/cm$^2$ | 2.0 mA/cm$^2$ | 3.0 mA/cm$^2$ |
| Comparative Example 1 | Coating X | 83.37% | 83.32% | 68% |
| Comparative Example 3 | BTO coating | 97.66% | 94.39% | 95.08% |
| Example 1 | BTO/Micro Si coating | 98.51% | 95.96% | 97.39% |

As shown in Table 1, it can be confirmed that in the case of using the negative electrode current collector produced according to Example 1 in which the coating layer of the present disclosure was formed and Comparative Example 3, the Coulombic efficiencies after 100 cycles based on 0.5 mA/cm$^2$ were 97.66% and 98.51%, which had electrochemical efficiencies of 14% or more as compared with Comparative Example 1.

Looking at the Coulombic efficiency after 100 cycles based on 2.0 mA/cm$^2$, it was confirmed that they were 94.39% and 95.96%, which had an electrochemical efficiency of 11% or more as compared with Comparative Example 1.

Looking at the Coulombic efficiency after 100 cycles based on 3.0 mA/cm$^2$, it was confirmed that they were 68%, 95.08% and 97.39%, which had an electrochemical efficiency of 17% or more as compared with Comparative Example 1.

However, it can be confirmed that the improvement rate was higher when Si was also contained together (Example 1) than when only BTO was contained in the coating layer (Comparative Example 3).

Further, as seen in FIG. 5, it can be confirmed that in the case of a sample having a coating layer formed according to Example 1, it was stable, and the overall average Coulombic efficiency was increased, as compared with Comparative Example 1 in which a coating layer was not formed and Comparative Example 3 in which a coating layer containing only BTO was formed. It can be seen that this tendency becomes more remarkable as the cycle increases in the order of Comparative Example 1<Comparative Example 3<Example 1.

Experimental Example 3

Coating Layer Effect Analysis—the Effect of Ferroelectric Materials

In order to confirm the effect of the ferroelectric materials contained in the used coating layer, the capacitance, which measures the quantity of ions accumulated on the electrode surface, was measured. The negative electrode current collector with a diameter of 11 mm formed by the method of Comparative Examples 1 to 3, and Li metal as a counter electrode were used, and a separator was added to prevent a short circuit between the two electrodes, thereby forming cells.

A current of 50 μA was applied to the cells until the voltage becomes 0V to 1.5V, wherein the capacitance of the discharging step was measured in order to measure the quantity of capacitance accumulated on the surface of the current collector electrode. At this time, in the case of Comparative Example 1, since it is a pure current collector without a coating layer, the capacitance per weight cannot be measured. Thus, the area capacitance is measured, and the method is as follows.

$$C \text{ (Areal Capacitance)} = (I \times \Delta t)/(A \times \Delta V)$$

I: current magnitude, $\Delta t$: charge (discharge) time, A: electrode cross-sectional area, $\Delta V$: voltage range

TABLE 2

| Category | | I | $\Delta t$ | A | $\Delta V$ | C (Areal) |
|---|---|---|---|---|---|---|
| Comparative Example 1 | Coating X | 50 μA | 101.5 s | 0.785 cm² | 1.5 V | 0.0043 F/cm² |
| Comparative Example 2 | Al₂O₃ coating | 50 μA | 276 s | 0.785 cm² | 1.5 V | 0.0117 F/cm² |
| Comparative Example 3 | BTO coating | 50 μA | 593.5 s | 0.785 cm² | 1.5 V | 0.0252 F/cm² |

As can be seen in Table 2, it was confirmed that the capacitance is measured large in the order of BaTiO$_3$ coating>Al$_2$O$_3$ coating>Coating X, and the tendency of the measured value is equal to the magnitude of the polarity.

That is, it can be seen that a high ion concentration area is formed around the electrode due to the high polarity characteristic of BaTiO$_3$.

Similarly, FIG. 6 shows the Li deposition voltage profile according to the current density using Comparative Examples 1 to 3. As can be seen in FIG. 6, it was confirmed that in the case of Comparative Example 3, a large Li nucleation under potential appears at the initial Li nucleation stage, as compared with Comparative Example 1. This is because Li nucleation is difficult to occur due to the insulator layer coated on the current collector electrode. Unusually, in the case of Comparative Example 3, it was confirmed that the under-potential is rapidly recovered, and it had rather smaller under-potential than that of Comparative Example 1 at the Li growth stage. In the case of Comparative Example 2 using a dielectric material, it was confirmed that it has an under-potential larger than that of Comparative Example 1 in both the Li nucleation step and the Li growth step. Taken together, due to the high polarity properties of BaTiO$_3$, a high Li ion concentration area is formed around the electrode, which can relieve the ion depletion area. Consequently, even at high current density, Li growth behavior shows a growth behavior similar to the current density condition of 0.5 mA/cm² rather than the dendritic growth that causes porous structures, and thus a dense Li structure can be formed. Thereby, it can be seen that the capacitance increases linearly as the permittivity increases as a dielectric, whereby using a ferroelectric material may exhibit superior effects than when using a general dielectric. In conclusion, when a ferroelectric material having a dielectric constant similar to that of BTO is used, the effect of the present application can be achieved.

Experimental Example 4

Coating Layer Effect Analysis—Effect of Metallic Materials Capable of Alloying with Lithium In order to confirm the effect of the Si material contained in the used coating layer, Si wt % of the BTO/Si coating layer was adjusted, and the lithium deposition experiment and the voltage profile at that time were confirmed. That is, a cell was constructed by using the negative electrode current collector with a diameter of 11 mm formed by the method of Comparative Example 3 and Examples 1 and 2, using Li metal as a counter electrode and adding a separator to prevent a short circuit between the two electrodes.

In order to analyze the under-potential of the Li nucleation and growth stages, 4.0 mAh/cm² of Li was deposited at a current density of 4.0 mAh/cm² for 1 hour, wherein the nucleation under-potential of the measured voltage profile was analyzed to confirm the nucleation-under potential according to wt %. The results are shown in FIG. 7.

As can be seen in FIG. 7, it was confirmed that as the Si wt % included in the BTO/Si coating layer increases, the Li under-potential in the nucleation step is reduced and it has an under-potential smaller than that of Comparative Example 3 which does not contain Si. That is, when Si is included, the nucleation under potential is reduced, and as the quantity of Si increases, the decrease width appears to increase. In light of this, it can be interpreted that Si contained in the coating layer acts as a Li nucleation site.

Further, in order to confirm the effect of the metallic material capable of alloying with lithium contained in the used coating layer, the metallic material capable of alloying with lithium (Ge, Sn, SnO₂) was changed and the lithium deposition experiment and the voltage profile at that time were confirmed. That is, a cell was constructed by using the negative electrode current collector with a diameter of 11 mm formed by the method of Comparative Example 3, Examples 1 and 3 to 5, using Li metal as a counter electrode, and adding a separator to prevent a short circuit between the two electrodes.

In order to analyze the under-potential of the Li nucleation and growth stages, 1.0 mAh/cm² of Li was deposited at a current density of 0.5 mA/cm² for 2 hours, wherein the Li nucleation under-potential of the measured voltage profile was analyzed, and the results are shown in FIG. 8, and the upper surface of and cross-sectional photographs taken by SEM showing the Li-deposited shape are shown in FIGS. 9 to 12.

Referring to FIG. 8, it can be confirmed that Sn, SnO₂, Ge and Si all have smaller under-potentials than Comparative Example 3 which does not contain Si. Moreover, when Si and Ge are included, the nucleation under potential is most reduced, and Sn and SnO₂ are less than Si or Ge, but they are reduced more than Comparative Example 3.

Meanwhile, referring to FIGS. 9 to 12, it was confirmed that when Si or Ge is added, it acts similarly as a Li nucleation site and thus, lithium deposition is induced into the BTO/Si layer or the BTO/Ge layer. In this case, it was also confirmed that the Li under-potential in the nucleation step is reduced.

Meanwhile, it can be confirmed that when a material with a small particle size, such as Sn or $SnO_2$, is added, the internal deposition is suppressed, and sphere-like Li is deposited mainly on the upper part of the coating layer. Therefore, as can be seen in FIG. 8, it was confirmed that although the Li under-potential in the nucleation step is reduced, it is not as effective as Si or Ge.

From the results of the examples as described above, according to the method according to the present disclosure, a high lithium ion concentration area is formed around the electrode due to the high polarity characteristics of the ferroelectric material and the interaction between lithium ions, and a lithium nucleation site is formed by a metallic material capable of alloying with lithium, whereby even under high current density conditions, improved electro-chemical lithium deposition behavior, and the formation of a dense lithium deposition structure resulting therefrom, and improved and stable Coulombic efficiency can be obtained.

In addition, the method according to the present disclosure has the advantage of having a low price and high productivity by a slurry casting process, and being suitable for mass production by a simple process.

INDUSTRIAL APPLICABILITY

The negative electrode current collector according to the present disclosure forms a high concentration of Li ions around the electrode through the interaction between the ferroelectric material and Li ions. Also, a metallic material capable of alloying with lithium, which causes an alloying reaction with Li, act as a nucleation seed, which lowers the under-potential required for nucleation, and can form a dense Li structure having a 3D structure and improve electrochemical performance.

In addition, since the coating layer is prepared in the form of a slurry according to the present disclosure, the process cost and time can be reduced compared to the conventional coating process such as deposition, and thus, has the advantage of being suitable for mass production.

The invention claimed is:

1. A negative electrode current collector for a lithium metal battery, comprising:
   a metal current collector substrate;
   a lithium metal deposited on the negative electrode current collector to form a negative electrode; and
   a coating layer formed on at least one surface of the metal current collector substrate,
   wherein the coating layer comprises a ferroelectric material, a metallic material capable of alloying with lithium, a conductive material, and a binder,
   wherein the coating layer contains 70 to 89 parts by weight of the ferroelectric material based on 100 parts by weight of the coating layer, and
   wherein the ferroelectric material interacts with lithium ions and the metallic material capable of alloying with lithium provides lithium nucleation seeds.

2. The negative electrode current collector according to claim 1, wherein the metal current collector substrate is one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy.

3. The negative electrode current collector according to claim 1, wherein the metal current collector substrate is a metal including copper.

4. The negative electrode current collector according to claim 1, wherein the coating layer contains 3 to 10 parts by weight of the metallic material capable of alloying with lithium, 3 to 10 parts by weight of the conductive material, and 5 to 20 parts by weight of the binder, based on 100 parts by weight of the coating layer.

5. The negative electrode current collector according to claim 1, wherein the ferroelectric material is at least one selected from the group consisting of organic ferroelectric materials containing $BaTiO_3$, $KNbO_3$, $NaTiO_3$, $KTaO_3$, $Pb(Zr, Ti)O_3$, $SrBiTa_2O_9$, $BiTiO_{12}$, $LiTaO_3$, $LiNbO_3$, $WO_3$, $KH_2PO_4$ or $NaKC_4H4O_6·4H_2O$ together with a polymer.

6. The negative electrode current collector according to claim 1, wherein the metallic material capable of alloying with lithium is at least one selected from the group consisting of Si, Ge, Sn, Pb, Bi, Sb, As, P, Au, Ag, Zn, Al, and their oxides.

7. The negative electrode current collector according to claim 1, wherein the metallic material capable of alloying with lithium is at least one selected from the group consisting of Si, Ge, and their oxides.

8. The negative electrode current collector according to claim 1, wherein the metallic material capable of alloying with lithium has a particle size (D50) of 10 nm to 10 μm.

9. The negative electrode current collector according to claim 1, wherein the binder is a polyacrylic acid (PAA) aqueous binder.

10. The negative electrode current collector according to claim 1, wherein the coating layer has a thickness of 1 to 10 μm.

11. A method of manufacturing the negative electrode current collector according to claim 1, the method comprising the steps of:
   (a) mixing the ferroelectric material that is powdered, the metallic material capable of alloying with lithium, and the conductive material to prepare a mixture;
   (b) mixing the binder that is aqueous with the mixture to prepare the coating layer that is a slurry;
   (c) applying the coating layer slurry to the metal current collector substrate; and
   (d) drying the metal current collector substrate to which the coating layer slurry is applied in an air atmosphere, and subsequently drying the same in a vacuum atmosphere.

12. A lithium metal battery comprising:
   an electrode assembly comprising:
      the negative electrode comprising
         the negative electrode current collector of claim 1 having the lithium metal deposited thereon;
      a positive electrode;
      a separator between the negative electrode and the positive electrode; and
      a lithium non-aqueous electrolyte.

* * * * *